(12) United States Patent
Beeke

(10) Patent No.: US 10,175,148 B2
(45) Date of Patent: Jan. 8, 2019

(54) UNIVERSAL SENSOR INTERFACE FOR MACHINE MONITORING SYSTEM

(71) Applicant: eproGmbH, Gronau (DE)

(72) Inventor: Hermann Beeke, Gescher (DE)

(73) Assignee: EPRO GMBH (DE)

( * ) Notice: Subject to any disclaimer, the term of this patent is extended or adjusted under 35 U.S.C. 154(b) by 313 days.

(21) Appl. No.: 14/880,367

(22) Filed: Oct. 12, 2015

(65) Prior Publication Data

US 2017/0102294 A1    Apr. 13, 2017

(51) Int. Cl.
| | |
|---|---|
| *G01M 99/00* | (2011.01) |
| *H02J 4/00* | (2006.01) |
| *G01D 21/02* | (2006.01) |
| *G05B 19/048* | (2006.01) |

(52) U.S. Cl.
CPC ............ *G01M 99/00* (2013.01); *G01D 21/02* (2013.01); *G05B 19/048* (2013.01); *H02J 4/00* (2013.01)

(58) Field of Classification Search
None
See application file for complete search history.

(56) References Cited

U.S. PATENT DOCUMENTS

2007/0198749 A1*   8/2007   Vazach ................... G06F 13/12
                                                                710/2

OTHER PUBLICATIONS

"TI Specification 1", TI data sheet, dated Jun. 2015.*
HP3631A, basic info sheet, Jun. 1995.*

* cited by examiner

*Primary Examiner* — James G Norman
(74) *Attorney, Agent, or Firm* — Luedeka Neely Group, P.C.

(57) ABSTRACT

A single universal sensor interface of a machine monitoring system is capable of providing a sensor supply voltage range that is selectable from 0V to −30V, 0V to +30V, or +/−15V, and a sensor signal input range of −30V to +30V to accommodate various types of sensors typically used in machine monitoring applications. Some embodiments of the interface also provide a buffered, unaltered sensor signal output.

15 Claims, 2 Drawing Sheets

UNIVERSAL SENSOR INTERFACE FOR MACHINE MONITORING SYSTEM

FIELD

This invention relates to the field of machine condition monitoring. More particularly, this invention relates to a universal sensor interface for accommodating multiple sensor types for use in a machine monitoring system.

BACKGROUND

In current online machine monitoring systems used for machine protection and fault prediction, a large variety of electronic monitoring devices are available, and each is typically specialized to accommodate a particular type of sensor for a particular monitoring application. Various sensor families include eddy current sensors, seismic sensors, passive magnetic sensors, piezoelectric sensors, Hall-effect sensors, and low frequency sensors. Multiple manufacturers offer a large variety of sensors within each of these sensor families for making protection and prediction measurements, and each manufacturer's sensor typically has its own characteristics related to sensor supply power, sensor signal voltage range, and application, such as those listed in Table 1 below.

TABLE 1

| Supply power | current, adjustable (0 to 8 mA) | piezo and seismic sensors |
|---|---|---|
| | voltage, adjustable (−22 V to −30 V) | eddy current sensors |
| | voltage, fixed +/−15 V | low frequency sensors |
| | voltage, fixed +30 V | Hall effect sensors |
| Signal range | −30 V to 0 V | eddy current sensors |
| | 0 V to +30 V | piezo, passive magnetic, Hall effect |
| | −15 V to +15 V | seismic, low frequency sensors |
| Measurement application | static (position, eccentricity) | eddy current sensors, low frequency |
| | dynamic (vibration) | eddy current, piezo, seismic |
| | speed (speed, key) | eddy current, Hall, passive magnetic |

Conventionally, for a machine monitoring system to accommodate the multiple sensor types with multiple sensor supply voltage requirements and signal voltage range requirements, multiple sensor power supplies and conditioning circuits are required. Sales and project management would be easier if a single sensor interface could handle all the various sensor types and measurements. Production and procurement would be more cost-effective and the number of devices in stock and their spare parts could be reduced significantly, for device manufacturers and their customers.

What is needed, therefore, is a universal sensor interface that is capable of interfacing with all the various different sensor families needed for machine monitoring.

SUMMARY

The above and other needs are met by a single universal sensor interface that is capable of providing a sensor supply voltage range that is selectable from 0V to −30V, 0V to +30V, or +/−15V, and a sensor signal input range of −30V to +30V to accommodate various types of sensors. Some preferred embodiments also provide a buffered, unaltered sensor signal output.

Various embodiments of the invention are directed to a sensor power and signal conditioning interface of a machinery health monitoring system. A preferred embodiment of the interface includes a sensor interface connector, a sensor signal input circuit, and a sensor power circuit. The sensor interface connector is operable to connect to multiple types of sensors that may be attached to a machine to monitor various characteristics of the machine. The sensor interface connector includes sensor signal terminals for receiving an analog sensor signal generated by a connected sensor, and positive and negative supply terminals for providing power to the connected sensor. The sensor signal input circuit receives the analog sensor signal via the sensor interface connector over a sensor signal input voltage range that accommodates analog sensor signals generated by the multiple types of sensors. The sensor power circuit includes a sensor power supply and several software controllable switches. The sensor power supply generates a positive supply voltage, a negative supply voltage, and a neutral supply voltage. A first software controllable switch selectively connects the neutral supply voltage of the sensor power supply to ground. A second software controllable switch selectively connects the positive supply terminal of the sensor interface connector to ground. A third software controllable switch selectively connects the negative supply terminal of the sensor interface connector to ground.

The sensor power circuit provides at least three supply voltage options to the positive and negative supply terminals of the sensor interface connector as determined by states of the first, second and third software controllable switches. The supply voltage options include:

a supply voltage having a magnitude of two times the negative supply voltage at the negative supply terminal and the positive supply terminal grounded when the first software controllable switch is open, the second software controllable switch is closed, and the third software controllable switch is open;

a supply voltage having a magnitude of two times the positive supply voltage at the positive supply terminal and the negative supply terminal grounded when the first software controllable switch is open, the second software controllable switch is open, and the third software controllable switch is closed; and the negative supply voltage at the negative supply terminal and the positive supply voltage at the positive supply terminal when the first software controllable switch is closed, the second software controllable switch is open, and the third software controllable switch is open.

In preferred embodiments, the sensor interface connector is operable to connect to multiple types of sensors including seismic sensors, piezoelectric accelerometers, Integrated Circuit Piezoelectric (ICP) vibration sensors, piezoelectric dynamic pressure sensors, electro-dynamic velocity sensors, eddy current sensors, low-frequency sensors, AC vibration sensors, DC displacement sensors, passive electro-magnetic sensors, Hall Effect tachometer sensors, shaft encoder sensors, and TTL pulse sensors.

In some embodiments, the negative supply voltage is −15V, two times the negative supply voltage is −30V, the positive supply voltage is +15V, and two times the positive supply voltage is +30V.

Some embodiments include an adjustable constant current source and a fourth software controllable switch that is electrically coupled to the positive supply terminal of the sensor interface connector. The fourth software controllable switch connects the adjustable constant current source to the positive supply terminal of the sensor interface connector when the fourth software controllable switch is in a first position, and it disconnects the adjustable constant current source from the positive supply terminal of the sensor interface connector when in a second position. In a preferred embodiment, the adjustable constant current source provides a constant sensor supply current ranging from 0 mA to 8 mA.

Some embodiments include adjustable voltage source and a fifth software controllable switch that is electrically coupled to the negative supply terminal of the sensor interface connector. The fifth software controllable switch for connecting the adjustable voltage source to the negative supply terminal of the sensor interface connector when the fifth software controllable switch is in a first position and for disconnecting the adjustable voltage source from the negative supply terminal of the sensor interface connector when the fifth software controllable switch is in a second position. In a preferred embodiment, the adjustable voltage source provides a sensor supply voltage ranging from −22V to −30V.

Some embodiments include a sixth software controllable switch that is electrically coupled to the sensor signal terminals and to the positive and negative supply terminals of the sensor interface connector. The sixth software controllable switch has first and second position. In the first position, the sensor signal terminal is electrically connected to the positive supply terminal, and the sensor return terminal is electrically connected to the negative supply terminal. In the second position the sensor signal terminal is electrically disconnected from the positive supply terminal, and the return terminal is electrically disconnected from the negative supply terminal. In this embodiment, the sensor interface accommodates two-wire sensors when the sixth software controllable switch is in the first position, and it accommodates four-wire sensors when the sixth software controllable switch is in the second position.

In some embodiments, the sensor signal input circuit comprises a 10:1 differential amplifier for accommodating analog sensor signals over a sensor signal input range of up to +/−30V.

In some embodiments, the interface has a buffered sensor signal output circuit that includes a buffered sensor signal output connector that is electrically coupled to an operational amplifier. The operational amplifier is powered by the same voltages from the sensor power circuit as are provided to the positive and negative supply of the sensor interface, such that a buffered sensor signal at the buffered sensor signal output connector is automatically set to a sensor signal range matching that of the connected sensor.

BRIEF DESCRIPTION OF THE DRAWINGS

Other embodiments of the invention will become apparent by reference to the detailed description in conjunction with the figures, wherein elements are not to scale so as to more clearly show the details, wherein like reference numbers indicate like elements throughout the several views, and wherein.

DETAILED DESCRIPTION

Figure 1:
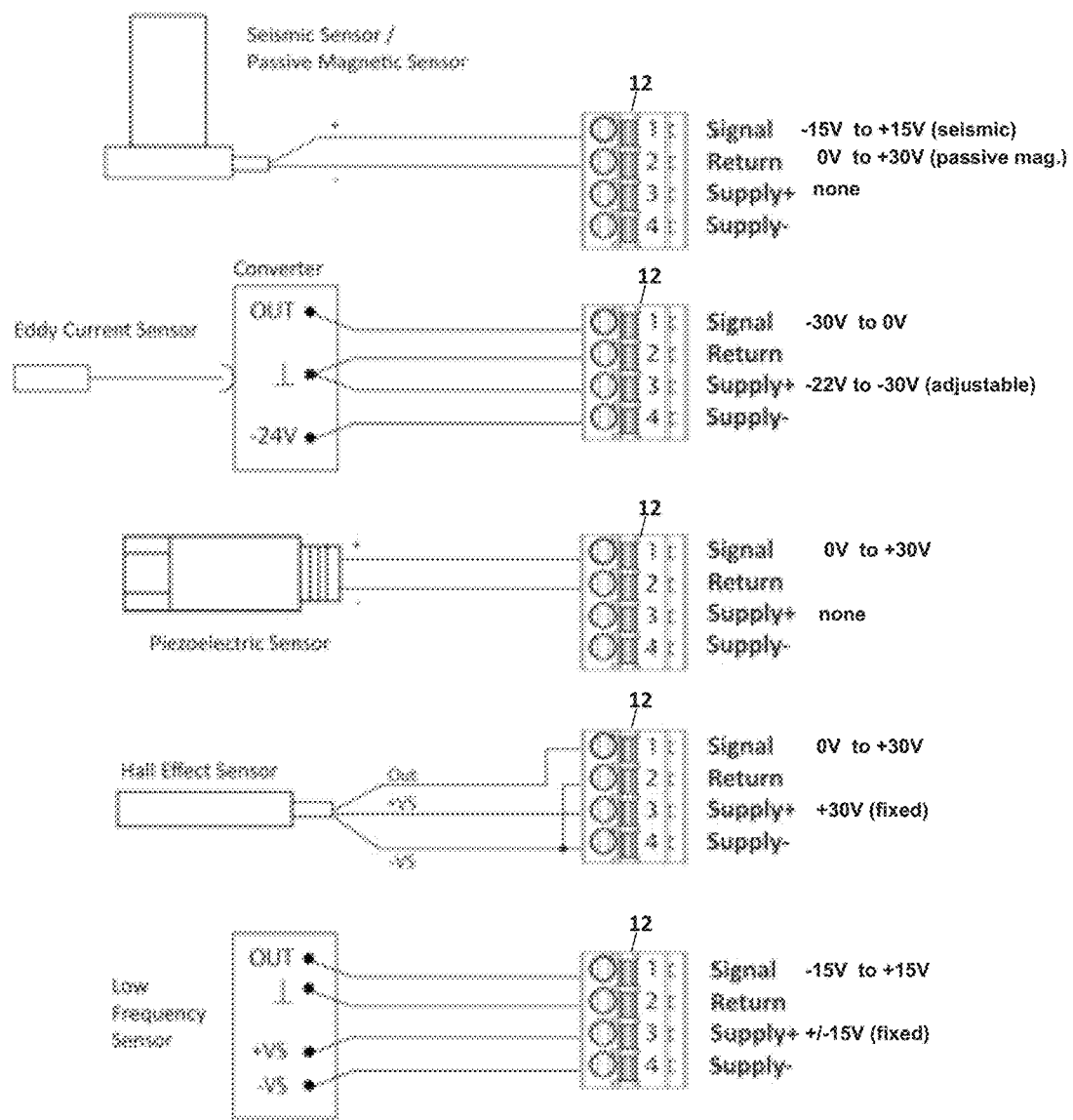
FIG. 1 depicts multiple different sensor types that may be typically used to measure multiple different machine characteristics in a machine monitoring system.

FIG. 1 depicts some examples of the various types of sensors that may be used to sense machine characteristics in a machine monitoring system. These exemplary sensors include a seismic/passive magnetic sensor, an eddy current sensor, a piezoelectric sensor, a Hall effect sensor, and a low-frequency sensor. The seismic/passive magnetic sensor and the piezoelectric sensor are examples of two-wire devices, in that they have only signal and return connections with an optional current supply internally connected to the signal and return. The other sensors are four-wire devices that have two power connections (Supply+ and Supply−) in addition to the signal and return connections. FIG. 1 also indicates the typical ranges of the output signals produced by these sensors and, for the four-wire devices, their power supply requirements.

Figure 2:
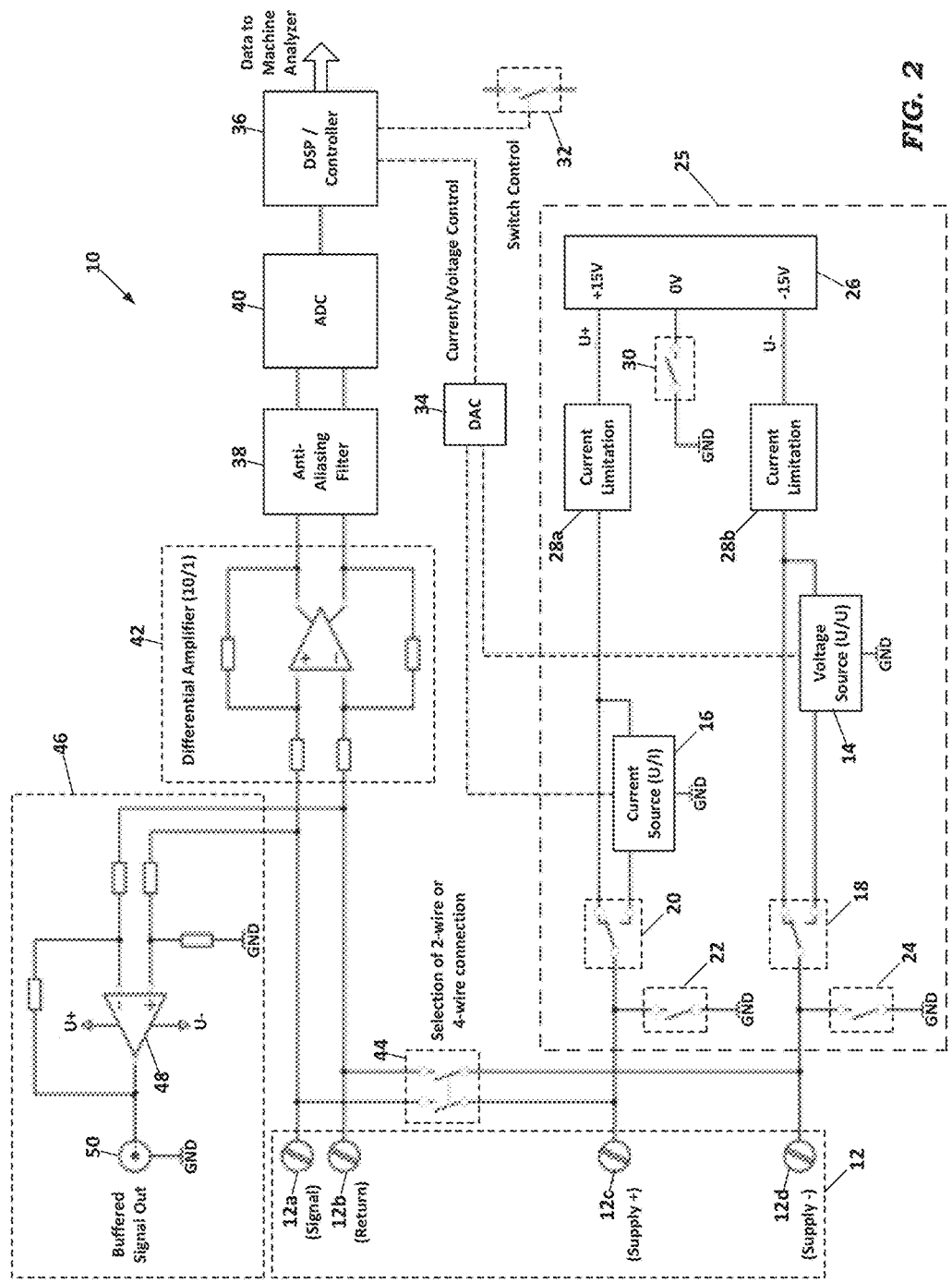
FIG. 2 depicts a universal sensor interface that can accommodate multiple different sensor types according to a preferred embodiment of the invention.

FIG. 2 depicts a preferred embodiment of a universal sensor interface 10 that is operable to accommodate all of the output signal ranges and the power supply requirements of the exemplary sensors depicted in FIG. 1 and other sensor types. In the preferred embodiment, a sensor power circuit 25 includes a +/−15V voltage supply 26. Depending on the type of sensor connected to the sensor interface connector 12, the reference to ground (GND) of the sensor power circuit 25 can be switched to the positive, neutral or negative pole of the supply 26 using the switches 18, 20, 22, 24 and 30, which are controlled via a switch control network 32 based on control signals from a digital signal processor (DSP) or controller 36. The switches described herein, such as the switches 18, 20, 22, 24, 30 and 44 may be implemented using relay contacts, electronic switches, solid state relay, or equivalents of such switching devices.

For example, a fixed −30V supply voltage is achieved with the following combination of switch positions:
  switch 30 open
  switch 22 closed (GND)
  switch 24 open.

A fixed +30V supply voltage is achieved with the following combination of switch positions:
  switch 30 open
  switch 22 open
  switch 24 closed (GND).

A fixed +/−15V supply voltage is achieved with the following combination of switch positions:
  switch 30 closed (GND)
  switch 22 open
  switch 24 open.

Although a +/−15V voltage supply 26 is used in the preferred embodiment, a voltage supply providing another range, such as +/−14V, could be used in alternative embodiments. Thus, it will be appreciated that the invention is not limited to any particular supply voltage range.

Sensors that need a constant current supply are typically operating on a positive supply voltage. Therefore, a preferred embodiment provides a constant current source (U/I) 16 in the positive branch of the supply circuit. The current source 16 is selectable using the switch 20, which is controlled by the DSP/controller 36 via the switch control network 32. If other voltage levels are needed for sensors operating in the negative voltage supply range, an adjustable voltage source (U/U) 14 can be selected in the negative branch of the circuit using the switch 18 that is also controlled by the DSP/controller 36 via the switch control network 32.

In a preferred embodiment, current limitation circuits 28a-28b are provided in the positive and negative supply branches to protect against excessive load current demand, such as due to a short circuit across the supply terminals. The voltage drop across the current limitation circuits 28a-28b is considered to be negligible.

To accommodate the sensor signal ranges of all sensors typically used in machine monitoring applications, preferred embodiments of the interface 10 provide a sensor signal input circuit 42, which in a preferred embodiment is an operational amplifier (OPAMP) configured as a differential amplifier having an input with a wide voltage range, such as a 10:1 voltage ratio. With a 10:1 voltage gain ratio, sensor signal ranges of −30V to +30V can be accommodated. In alternative embodiments, voltage ratios other than 10:1 can be provided by the OPAMP 42 to accommodate other input ranges, such as +/−25V. Thus, it will be appreciated that the invention is not limited to any particular sensor signal range.

Preferred embodiments include an analog-to-digital converter (ADC) 40, such as a 24 bit Delta-Sigma ADC, that provides for data acquisition of DC signals (static measurement) as well as for AC signals (dynamic, speed measurement), and a single anti-aliasing filter 38 in front of the ADC 40. The DSP/controller 36 preferably performs digital processing and filtering of the sensor signals, such as for static, dynamic or speed measurements of the monitored machines.

A double-pole switch 44 provides for selecting a two-wire sensor or a four-wire sensor, thereby eliminating the need for external wiring. A four-wire sensor is selected with the switch 44 in the open position, and a two-wire sensor is selected with the switch 44 in the closed position. The switch 44 is preferably controlled by the DSP/controller 36 via the switch control network 32.

As shown in FIG. 2, a preferred embodiment includes a buffered sensor signal output circuit 46, which includes an OPAMP 48 that is supplied with the same supply voltage (U+ and U−) as is provided at the voltage supply 26. Thus, the buffered signal output at the connector 50 is automatically set to the appropriate sensor signal voltage range. The buffered signal output may be monitored, such as using an oscilloscope, or it may be provided to a machine analysis system for prediction purposes.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A sensor power and signal conditioning interface of a machinery health monitoring system, the sensor power and signal conditioning interface comprising:
   a sensor interface connector that is operable to connect to multiple types of analog sensors that may be attached to a machine to monitor various characteristics of the machine, the sensor interface connector including at least four terminals for connecting to signal wires and power wires of a connected analog sensor, the at least four terminals comprising:
      at least two sensor signal terminals for receiving an analog sensor signal generated by the connected analog sensor; and
      a positive supply terminal and a negative supply terminal for providing power to the connected analog sensor;
   a sensor signal input circuit that is electrically coupled to the at least two sensor signal terminals of the sensor interface connector, the sensor signal input circuit operable to receive the analog sensor signal via the sensor interface connector over a sensor signal input voltage range that accommodates analog sensor signals generated by the multiple types of analog sensors; and
   a sensor power circuit that is electrically coupled to the positive and negative supply terminals of the sensor interface connector, the sensor power circuit for supplying power to the connected analog sensor via the sensor interface connector, the sensor power circuit comprising:
      a sensor power supply operable to generate a positive supply voltage, a negative supply voltage, and a neutral supply voltage;
      a first software controllable switch for selectively connecting the neutral supply voltage of the sensor power supply to ground;
      a second software controllable switch for selectively connecting the positive supply terminal of the sensor interface connector to ground; and
      a third software controllable switch for selectively connecting the negative supply terminal of the sensor interface connector to ground,
   wherein, the sensor power circuit is operable to provide at least three supply voltage options to the positive and negative supply terminals of the sensor interface connector as determined by states of the first, second and third software controllable switches, the at least three supply voltage options including:
      a supply voltage having a magnitude of two times the negative supply voltage is provided to the negative supply terminal of the sensor interface connector, and the positive supply terminal of the sensor interface connector is grounded when
         the first software controllable switch is open,
         the second software controllable switch is closed, and
         the third software controllable switch is open,
      a supply voltage having a magnitude of two times the positive supply voltage is provided to the positive supply terminal of the sensor interface connector, and the negative supply terminal of the sensor interface connector is grounded when
         the first software controllable switch is open,
         the second software controllable switch is open, and
         the third software controllable switch is closed, and
      the negative supply voltage is provided to the negative supply terminal of the sensor interface connector, and the positive supply voltage is provided to the positive supply terminal of the sensor interface connector when
         the first software controllable switch is closed,
         the second software controllable switch is open, and
         the third software controllable switch is open.

2. The sensor power and signal conditioning interface of claim 1 wherein the sensor interface connector is operable to connect to multiple types of sensors selected from the group consisting of seismic sensors, piezoelectric accelerometers, Integrated Circuit Piezoelectric (ICP) vibration sensors, piezoelectric dynamic pressure sensors, electro-dynamic velocity sensors, eddy current sensors, low-frequency sensors, AC vibration sensors, DC displacement sensors, passive electro-magnetic sensors, Hall Effect tachometer sensors, shaft encoder sensors, and TTL pulse sensors.

3. The sensor power and signal conditioning interface of claim 1 wherein the negative supply voltage is −15V, two times the negative supply voltage is −30V, the positive supply voltage is +15V, and two times the positive supply voltage is +30V.

4. The sensor power and signal conditioning interface of claim 1 wherein the sensor power circuit further comprises:
an adjustable constant current source; and
a fourth software controllable switch electrically coupled to the positive supply terminal of the sensor interface connector, the fourth software controllable switch for connecting the adjustable constant current source to the positive supply terminal of the sensor interface connector when the fourth software controllable switch is in a first position and for disconnecting the adjustable constant current source from the positive supply terminal of the sensor interface connector when the fourth software controllable switch is in a second position.

5. The sensor power and signal conditioning interface of claim 4 wherein the adjustable constant current source provides a constant sensor supply current ranging from 0 mA to 8 mA.

6. The sensor power and signal conditioning interface of claim 1 wherein the sensor power circuit further comprises:
an adjustable voltage source; and
a fifth software controllable switch electrically coupled to the negative supply terminal of the sensor interface connector, the fifth software controllable switch for connecting the adjustable voltage source to the negative supply terminal of the sensor interface connector when the fifth software controllable switch is in a first position and for disconnecting the adjustable voltage source from the negative supply terminal of the sensor interface connector when the fifth software controllable switch is in a second position.

7. The sensor power and signal conditioning interface of claim 6 wherein the adjustable voltage source provides a sensor supply voltage ranging from −22V to −30V.

8. The sensor power and signal conditioning interface of claim 1 further comprising:
the at least two sensor signal terminals of the sensor interface connector comprising a signal terminal and a return terminal; and
a sixth software controllable switch electrically coupled to the at least two sensor signal terminals and to the positive and negative supply terminals of the sensor interface connector, the sixth software controllable switch having:
a first position in which the signal terminal is electrically connected to the positive supply terminal, and the return terminal is electrically connected to the negative supply terminal; and
a second position in which the signal terminal is electrically disconnected from the positive supply terminal, and the return terminal is electrically disconnected from the negative supply terminal,
wherein
the sensor power and signal conditioning interface accommodates two-wire sensors when the sixth software controllable switch is in the first position, and
the sensor power and signal conditioning interface accommodates four-wire sensors when the sixth software controllable switch is in the second position.

9. The sensor power and signal conditioning interface of claim 1 wherein the sensor signal input circuit comprises a 10:1 differential amplifier for accommodating analog sensor signals over a sensor signal input range of up to +/−30V.

10. The sensor power and signal conditioning interface of claim 1 further comprising analog-to-digital conversion circuitry for converting the analog sensor signal from the sensor signal input circuit into a digital measurement signal.

11. The sensor power and signal conditioning interface of claim 10 further comprising a buffered sensor signal output circuit comprising a buffered sensor signal output connector that is electrically coupled to an operational amplifier, where the operational amplifier is powered by the same voltages from the sensor power circuit as are provided to the positive and negative supply voltages, such that a buffered sensor signal at the buffered sensor signal output connector is automatically set to a sensor signal range matching that of the connected sensor, wherein the buffered sensor signal output circuit has no impact on the operation of the analog-to-digital conversion circuitry.

12. A sensor power and signal conditioning interface of a machinery health monitoring system, the sensor power and signal conditioning interface comprising:
a sensor interface connector that is operable to connect to multiple types of analog sensors that may be attached to a machine to monitor various characteristics of the machine, the sensor interface connector including at least four terminals for connecting to signal wires and power wires of a connected analog sensor, the at least four terminals comprising:
a signal terminal and a return terminal for receiving an analog sensor signal generated by the connected analog sensor; and
a positive supply terminal and a negative supply terminal for providing power to the connected analog sensor;
a sixth software controllable switch electrically coupled to the signal and return terminals and to the positive and negative supply terminals of the sensor interface connector, the sixth software controllable switch having:
a first position in which the signal terminal is electrically connected to the positive supply terminal, and the return terminal is electrically connected to the negative supply terminal; and
a second position in which the signal terminal is electrically disconnected from the positive supply terminal, and the return terminal is electrically disconnected from the negative supply terminal,
wherein
the sensor power and signal conditioning interface accommodates two-wire sensors when the sixth software controllable switch is in the first position, and
the sensor power and signal conditioning interface accommodates four-wire sensors when the sixth software controllable switch is in the second position;
a sensor signal input circuit that is electrically coupled to the sensor signal terminals of the sensor interface connector, the sensor signal input circuit including a 10:1 differential amplifier for receiving the analog sensor signal via the sensor interface connector over a sensor signal input range of up to +/−30V, thereby accommodating analog sensor signals generated by the multiple types of analog sensors; and
a sensor power circuit that is electrically coupled to the positive and negative supply terminals of the sensor interface connector, the sensor power circuit for supplying power to the connected sensor via the sensor interface connector, the sensor power circuit comprising:

a sensor power supply operable to generate a +15V supply voltage, a −15V supply voltage, and 0V supply voltage;

a first software controllable switch for selectively connecting the 0V supply voltage of the sensor power supply to ground;

a second software controllable switch for selectively connecting the positive supply terminal of the sensor interface connector to ground; and a third software controllable switch for selectively connecting the negative supply terminal of the sensor interface connector to ground, wherein, the sensor power circuit is operable to provide at least three supply voltage options to the positive and negative supply terminals of the sensor interface connector as determined by states of the first, second and third software controllable switches, the at least three supply voltage options including:

a −30V supply voltage is provided to the negative supply terminal of the sensor interface connector, and the positive supply terminal of the sensor interface connector is grounded when
the first software controllable switch is open,
the second software controllable switch is closed, and
the third software controllable switch is open, a +30V supply voltage is provided to the positive supply terminal of the sensor interface connector, and the negative supply terminal of the sensor interface connector is grounded when
the first software controllable switch is open,
the second software controllable switch is open, and
the third software controllable switch is closed, and the −15V supply voltage is provided to the negative supply terminal of the sensor interface connector, and the +15V supply voltage is provided to the positive supply terminal of the sensor interface connector when
the first software controllable switch is closed,
the second software controllable switch is open, and
the third software controllable switch is open; and a buffered sensor signal output circuit comprising a buffered sensor signal output connector that is electrically coupled to an operational amplifier, where the operational amplifier is powered by the same voltages from the sensor power circuit as are provided to the positive and negative supply voltages, such that a buffered sensor signal at the buffered sensor signal output connector is automatically set to a sensor signal range matching that of the connected sensor.

13. The sensor power and signal conditioning interface of claim 12 wherein the sensor power circuit further comprises:
an adjustable constant current source; and
a fourth software controllable switch electrically coupled to the positive supply terminal of the sensor interface connector, the fourth software controllable switch for connecting the adjustable constant current source to the positive supply terminal of the sensor interface connector when the fourth software controllable switch is in a first position and for disconnecting the adjustable constant current source from the positive supply terminal of the sensor interface connector when the fourth software controllable switch is in a second position.

14. The sensor power and signal conditioning interface of claim 13 wherein the adjustable constant current source provides a constant sensor supply current ranging from 0 mA to 8 mA.

15. The sensor power and signal conditioning interface of claim 12 wherein the sensor power circuit further comprises:
an adjustable voltage source; and
a fifth software controllable switch electrically coupled to the negative supply terminal of the sensor interface connector, the fifth software controllable switch for connecting the adjustable voltage source to the negative supply terminal of the sensor interface connector when the fifth software controllable switch is in a first position and for disconnecting the adjustable voltage source from the negative supply terminal of the sensor interface connector when the fifth software controllable switch is in a second position.

* * * * *